United States Patent [19]

Schneider

[11] Patent Number: 4,661,007

[45] Date of Patent: Apr. 28, 1987

[54] CORNER GUIDE ASSEMBLY

[75] Inventor: Alfred Schneider, Kreuztal, Fed. Rep. of Germany

[73] Assignee: Siegenia-Frank KG, Siegen, Fed. Rep. of Germany

[21] Appl. No.: 517,082

[22] Filed: Jul. 22, 1983

[30] Foreign Application Priority Data

Jul. 23, 1982 [DE] Fed. Rep. of Germany ....... 8221037
Feb. 23, 1983 [DE] Fed. Rep. of Germany ....... 8305078

[51] Int. Cl.$^4$ .............................................. F16D 1/00
[52] U.S. Cl. ..................................... 403/24; 403/161; 403/91; 403/403
[58] Field of Search ................... 403/12, 402, 403, 24, 403/161, 91

[56] References Cited

FOREIGN PATENT DOCUMENTS

| B27288 | 12/1955 | Fed. Rep. of Germany | 403/402 |
| 1683710 | 2/1971 | Fed. Rep. of Germany | 403/402 |
| 8128583 | 3/1982 | Fed. Rep. of Germany | . |
| 8201403 | 6/1982 | Fed. Rep. of Germany | . |
| 2238383 | 2/1975 | France | 403/402 |
| 916827 | 1/1963 | United Kingdom | 403/402 |

Primary Examiner—Andrew V. Kundrat
Attorney, Agent, or Firm—Blodgett & Blodgett

[57] ABSTRACT

A corner guide assembly having a first and second housing arms each having straight and curved guide grooves and a flexible resilient connector connected to elongated drive rods slidably located in the straight guide grooves.

8 Claims, 7 Drawing Figures

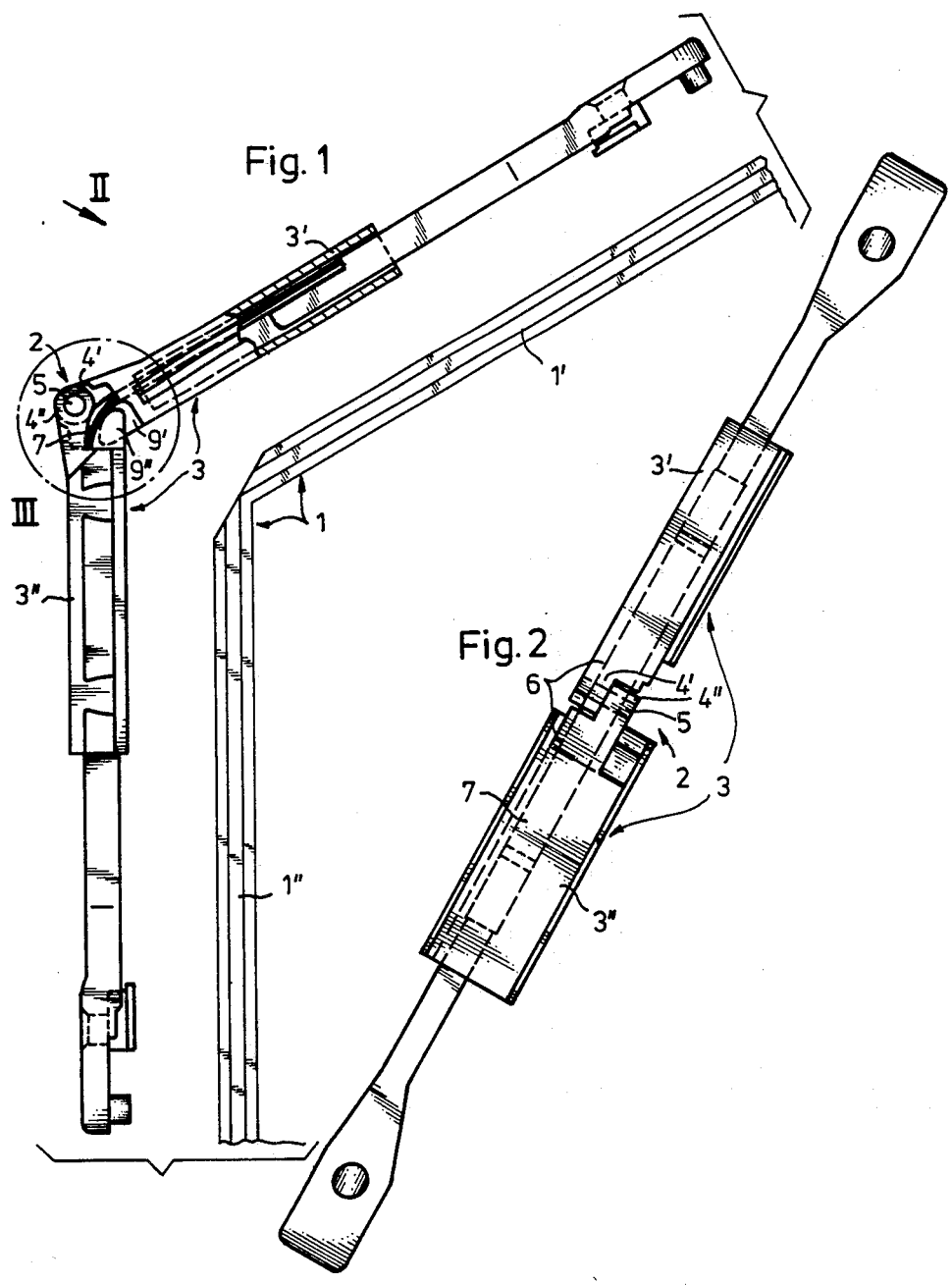

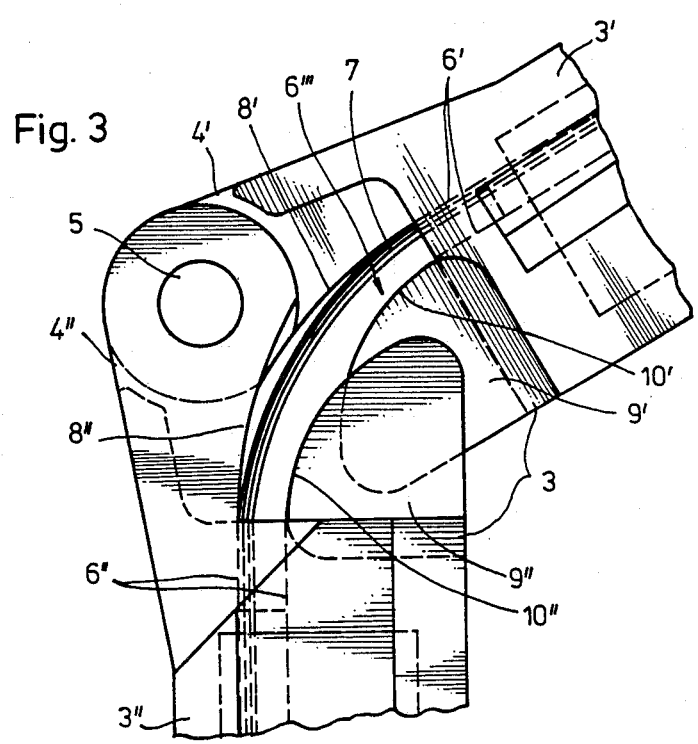

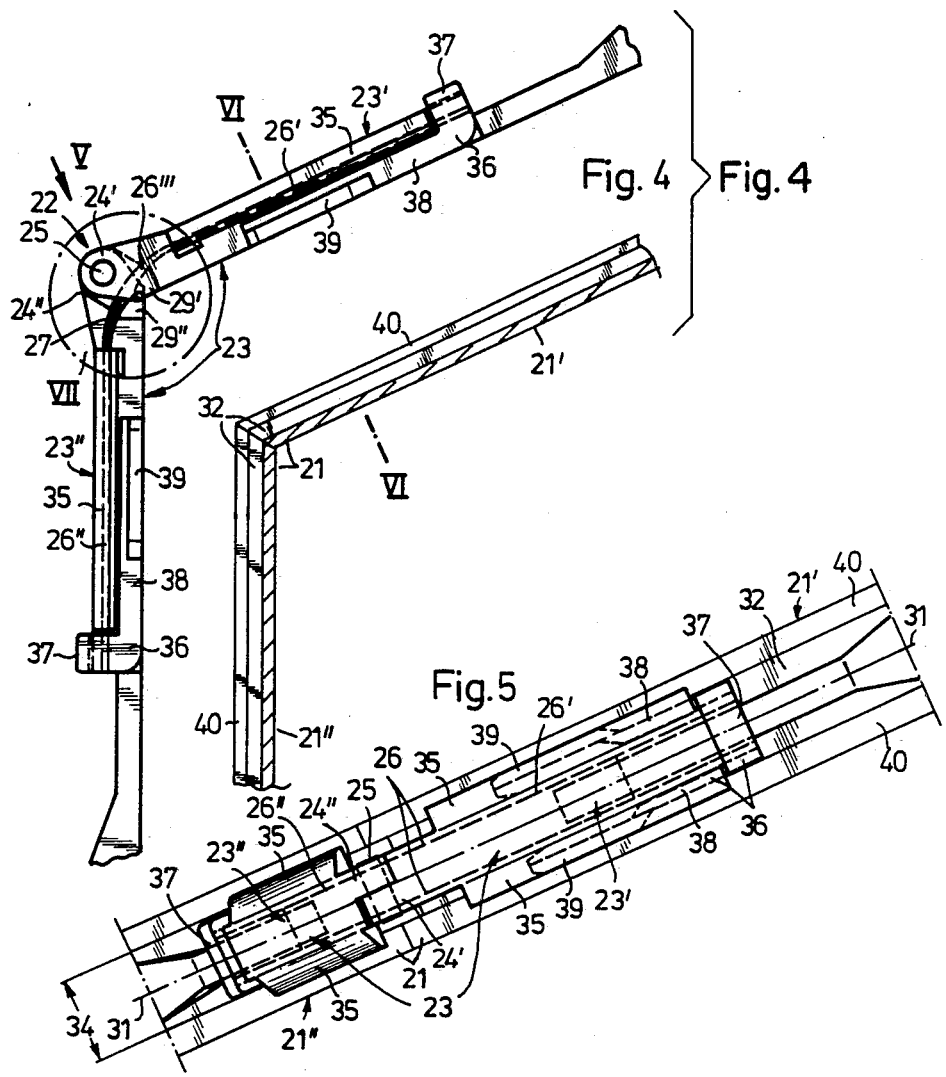

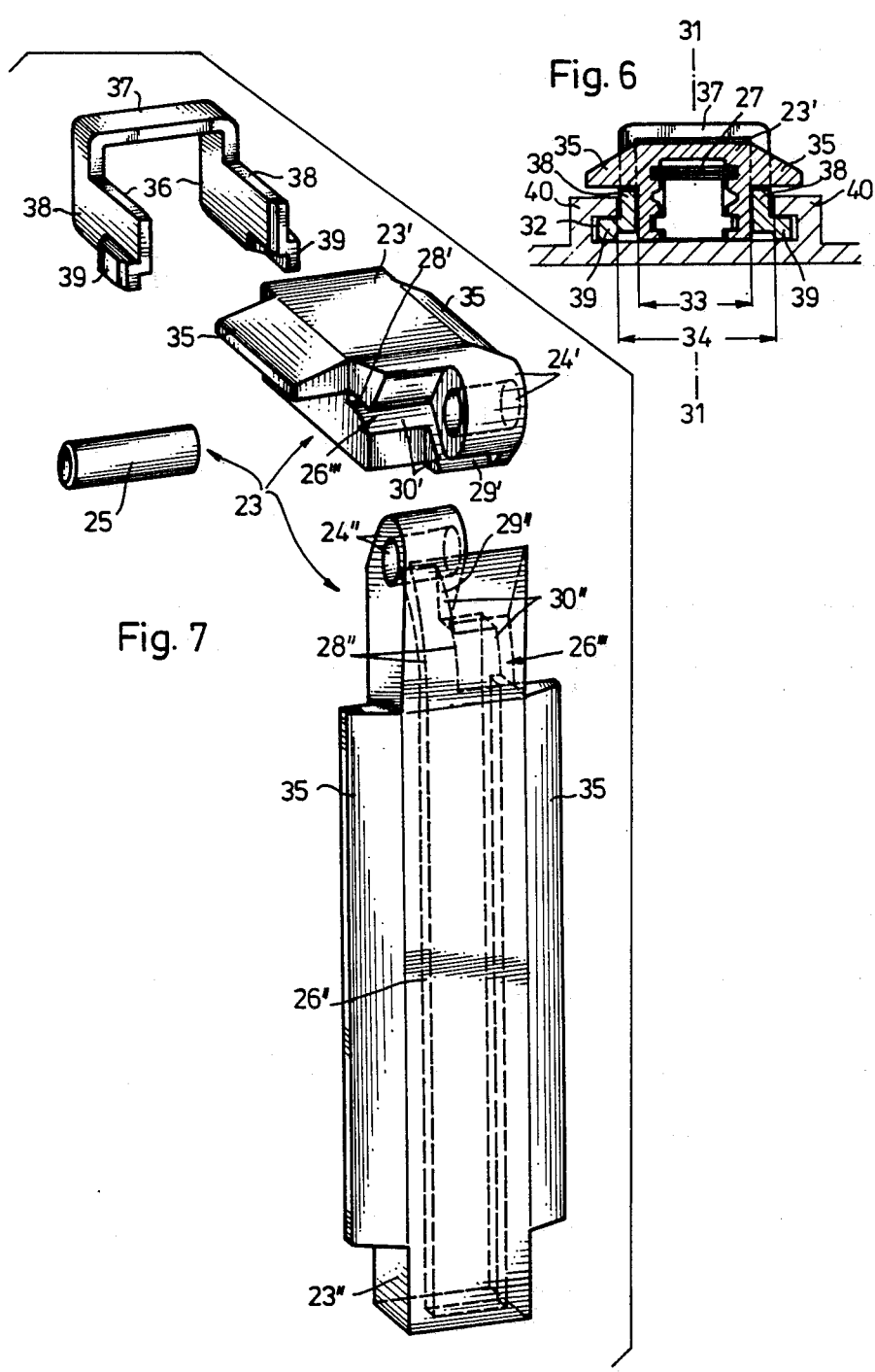

CORNER GUIDE ASSEMBLY

BACKGROUND OF THE INVENTION

The invention is concerned with a corner guide assembly for drive-rod fittings to be used on windows, doors, etc. with an angle housing which contains a guide groove for pull and push stiff movements of a flexible guide member which, for example, can be made from spring steel bands, and runs within the housing arms in a straight line and within the corner area within a curved guide section. Both housing arms are pivotally connected to each other within the corner area in the main plane of the angle housings by a bolt and where the housing arms are supported within lugs.

With German patent publication DE-GM No. 81 28 583, a corner guide assembly has been suggested by which both arms are pivotally connected to each other within the corner area in the main plane of the angle housings by a bolt, and where a the longitudinal center line of a curved guide section of the guide grooves runs through bolt axis. Each housing arm has an end area positioned with its apex on the bolt axis and the partial areas facing each other in an obtuse angle, and where the end areas on one hand have a reset support area concentric around the bolt axis and on the hand an extended support area which also is concentric around the bolt axis. The reset support areas of each arm engage the extended support areas of the other arm interchangeably with a toggle linkage into each other. Circle sector shaped plugs are arranged on both outside areas of the arms. The plugs of both arms engage into a common support ring.

The design of a corner guide has the advantage that it is usable in the same design form for different corner angles of windows and doors and automatically adjusts itself during operation to the corresponding mounting conditions. The same system may be used on windows and door designs made from different materials if the angle housing has been adjusted to the corresponding material selection for windows and doors.

German publication DE-GM No. 82 01 403 shows a corner guide for drive rod fittings to be used on windows, doors, etc. by which on the back side of an angle-shaped support rail, a guide groove with C-shaped cross-section is used for pull- and push stiff flexible guide members, for example, steel bands, and has two arms connected by a yoke-shaped transfer area. The element which forms the guide groove is bendable in its curved transfer area. Furthermore, the arms, located within the support rails, are connected to each other within the corner area and are angle-displaceable. At least one of the guide grooves, limited in length displacement, is guided on the neighboring arm of the support rail. In this case the two arms of the support rail are flexibly connected to each other in their corner area around a standard bolt in respect to the main plane, and in such a way that the support opening of an arm of the support rail engage into support openings on the other arm.

Also this design of a corner guide is usable for all presently available corner designs of windows and doors, and may be fitted simply to the corresponding mounting condition.

An Object of this invention is the provision of a corner guide assembly of the previously described type which is simple in design and easy to install.

The object of the invention is achieved by having the outer limit of the curved guide section of the guide groove formed by the inside areas of the support openings for the bolt with connects the two housing arms with each other. The inner limit of the curved guide section is formed by tongues which are attached to the housing arms which, at least partially, overlap for all angular positions of the two arms.

The invention furthermore suggests that the outer radius on the inside areas of the support openings correspond at least to the largest present outer radius for the spring bands, and the inner bend radius for the inside is fitted to the smallest present bend radius of the spring-steel bands on the tongue areas facing the support openings. On a preferred design example of a corner guide assembly, the tongues on the arms are always arranged on the inside of the support openings. According to another embodiment of the invention, the tongues on each arm are made from several lamellas which are positioned side by side at a certain distance from each other and which engage each other interchangeably.

The above-described design of a corner guide assembly can even be furthermore explored, which puts simplification on fabrication and installation in the right perspective.

The solution of the task consists mainly in that the angle housing consists of two identical housing arms which are pivotally connected to each other by a standard bolt for pivoting within the main plane of the angle housing.

A special advantage is achieved if the corner guide assembly is built in such a way that both arms of the angle housing over the straight length of the guide groove have a symetric form in regards to the main plane of the angle housing, and the areas of the guide groove at the curved section are not symmetrically formed in regards to the main plane of the angle housing.

A corner guide assembly according to this invention, by which the angle housing with its arms can be set into an undercut groove of a frame corner of a window, door, etc., made from metal or plastic, is especially favorable, when the cross-section width of both arms on the cross-section area engage an undercut groove of smaller dimension than the groove width and is equipped with bars extending to the outside from the cross-section area with the undercut groove; and the clamping parts are formed by extending webs on the areas of a yoke and with its sling area surrounds the free end of the arms of the angle housing from three sides and with its arms engages the webs from underneath.

BRIEF DESCRIPTION OF THE DRAWINGS

The character of the invention, however, may be best understood by reference to one of its structural forms, as illustrated by the accompanying drawings, in which:

FIG. 1 is a front elevational view of an approximate size and in side view are shown a corner guide assembly embodying the principles of the present invention shown with a corner of a closure member which has an obtuse angle, FIG. 2 is a side elevational view of the corner guide assembly looking in the direction of arrow II of FIG. 1, FIG. 3 is an enlarged view of the portion of FIG. 1 in larger scale which is enclosed by the dot and dash circle III, FIG. 4 is a view similar in FIG. 1, showing a modified corner guide assembly, FIG. 5 is a side elevational view of the corner guide assembly of FIG. 4, looking in the direction of arrow V, FIG. 6 is a cross-sectional view taken along the line VI—VI of FIG. 4, and FIG. 7 is an enlarged perspective view of elements in the area of FIG. 4 which is enclosed by the dot and dash circle VII.

FIG. 1 shows in schematic the corner area 1 of a standard window or door closure formed by two arms 1' and 1" which meet at an obtuse angle. The two arms 1' and 1" of the window or door closure at the corner area 1, however, may also extend at a right angle to each other. In every case, the same corner guide assembly 2 may be used for the window or door closures having different corner angles. So that the guide assembly 2 fits to the various angular positions between the two arms 1' and 1" at the corners without any problems, the two housing arms 3' and 3" of the angle housing 3 are pivotally adjustable relative to each other within their relative angular position.

On the shown design example of a corner guide assembly 2, the two housing arms 3' and 3" of the angle housing 3 are made from a pressure cast metal preferably zinc or brass. In some cases, the arms may be made also by injection molding from wear-resistant plastic. The facing ends of housing arms 3' and 3" of the angle housing 3 are equipped with casted support lugs 4', 4" respectively into which anchor bolt 5 engages an extends in the main plane of the angle housing 3. Within the housing arms 3' and 3" of the angle housing 3, there is formed a guide groove 6 for a flexible guide assembly 7 which has two straight line guide sections 6' and 6" and a center section 6'''. The straight line guide section 6' and half of the attached curved guide section 6''' are located within the housing arm 3'. The other straight line guide section 6", and the other half of the curved guide section 6''' are located within the housing arm 3".

The outer surface of the curved guide section 6''' of guide groove 6 is always shaped by the inside surfaces 8' and 8" of the support lugs 4' and 4", respectively, of the housing arms 3' and 3", respectively. The inner surface of the curved guide section 6''' of guide groove 6, however, are shaped by overlapping tongues 9' and 9" on the housing arms 3' and 3", respectively. Tongues 9' and 9" overlapy each other, at least partially, in all active angular positions of the housing arms 3' and 3" and contain curved guide areas 10' and 10" opposite the support lugs 4' and 4".

The radius on the inside surfaces 8' and 8" of the support lugs 4' and 4", respectively, correspond to the largest available bending radius of the flexible guide member 7 which consist of several spring steel bands. The radius on the inside surfaces 10' and 10" of the support openings 4' and 4", respectively, corresponds to the smallest bending radius of the flexible guide member 7.

As can be seen in FIG. 2, the support lugs 4' and 4" have a combined width which is considerably larger than the width of the guide member 7 which is displaceably guided within the guide groove 6. However, it is sufficient that the combined width of the tongues is approximately the same as the width of guide member 7.

A further modification is that the tongues 9' and 9" on the two housing arms 3' and 3", respectively, of the angle housing 3 consist of several lamellas positioned side by side, spaced from each other and extending over the width of the flexible guide member 7 and interdigitatingly engaging each other. For this reason, it is possible, for example, to arrange on each of the two housing arms 3' and 3" two of these tongue lamellas side by side and spaced from each other in such a way that they are kept engaged with each other by the flexible connection of the two housing arms 3' and 3" over support lugs 4' and 4" and over the support bolt 5.

Referring to FIGS. 4–7, a modified corner guide assembly 22 includes an angle housing 23 consisting of two housing arms 23' and 23". The facing ends of arms 23' and 23" are equipped with formed support lugs 24' and 24" into which is engaged a bolt 25 which extends in the main plane of angle housing 23.

A guide groove 26 is located within the housing arms 23' and 23" of the angle housing 23. The guide groove 26 is adapted to receive a flexible guide member 27 which contains two straight sections 26' and 26" and a curved center section 26'''.

The straight line guide section 26' and one half of the curved guide section 26''' are located within the housing arm 23' of the angle housing 3. The straight line guide section 26" with the other half of the curved guide section 26''' are located within the arm 23". The outer surface of the curved guide section 26''' of guide groove 26 is defined by the inside surfaces 28' and 28" of support lugs 24' and 24", respectively, in the housing arms 23' and 24", respectively. Special tongues 29' and 29" are formed on the housing arms 23' and 23" for defining the inside surface of the bow-shaped guide section 26''' of guide groove 26. Tongues 29' and 29" overlap, at least partially, in all active angle positions of the two housing areas 23' and 23" and are equipped with curved guide surfaces 30' and 30", respectively, opposite the support lugs 24' and 24".

The curvature of the inside surfaces 28' and 28" of the support lugs 24' and 24" corresponds to the largest existing outside bending radius for the flexible guide assembly 27 which consists of several spring steel bands. In comparison, the curvature of surfaces 30' and 30" of the support openings 24' and 24", respectively, correspond to the smallest bending radius of the flexible guide member 27.

The two support lugs 24' and 24" have a combined width which is considerably larger than the width of the flexible guide member 7 which is displaceably positioned within the guide groove 26. The tongues 29' and 29" are about as wide as the guide member 27 (see FIG. 5).

The tongues 29' and 29" on the two housing arms 23' and 23", respectively, of angle housing 3, can each be made from several lamellas positioned side by side over the width of the flexible guide member 7 and engage each other interdigitatingly.

For example, it is possible to arrange the lamellas of the tongue 29' and 29" spaced from each other within the two housing arms 29' and 23" in such a way that they, with the flexible connection of the two housing arms 23' and 23", are engaged with each other over the bolt lugs 24' and 24" and with the support 25.

From the drawings, it can be seen that the angle housing 23 consists of two identical housing arms 23' and 23" which are connected by a bolt 25 which extends normal to the main plane 31—31 of the angle housing.

Both housing arms 23' and 23" of the angle housing have a symmetric form over the length area of the guide groove 26 with straight line guide sections 26' and 26" in the main plane 31—31 of angle housing 23. The portions of arms 23' and 23" which form the guide section 26" are not symmetric, but designed in such a way that they, together, form the curved guide section 26''' of the guide groove 26.

It is important that the two housing arms 23' and 23" of angle housing 23 which forms the mold parts are identical. This enables the arms to be connected with each other during mounting of the angle housing 23, as can be clearly seen in FIG. 7. In cases where the window or door closure is put together by metal or plastic fittings which have undercut grooves 32 for displaceable guides of driving rods, the guide assembly 22 is inserted into the grooves 32 at the corner areas 21 of the windows or door closures, as can be seen from FIGS. 4, 5 and 6. In such cases, the cross-sectional width 33 of each of the housing arms 23' and 23" is smaller than the groove width 34. On the cross-section area outside the undercut groove 32, the housing arms 23' and 23" have laterally extending flanges 35

Both housing arms 23' and 23" of the angle housing 23 are fixed with yoke-shaped clamps within the undercut groove 32. The connecting part 37 of the yoke 36 surrounds the free end of the housing arm from three sides. The two arms 38 of yoke 36 extend into the open space between the cross-section areas of the housing arms 23' and 23" having the width 33 and the groove width 34 of the undercut groove 32 and engage flanges 35 on the housing arms 23' and 23" as indicated in the FIGS. 4, 5 and 6. Both arms 38 of the yoke 36 are equipped with outwardly extending flanges 39 which engage inwardly extending hood-shaped opposing profile parts 40 on thearms 21' and 21" of the corner area 21.

The invention having been thus described, what is claimed as new and desired to secure by Letters Patent is:

1. Corner guide assembly for the corner which is formed between two adjoining sides of a closure member, said corner guide assembly comprising:
   (a) a first housing arm having a first straight longitudinal guide groove and a first curved longitudinal guide groove which extends from one end of said first straight guide groove to a first opening at one end of said first housing arm, said first curved guide groove having a first outer curved surface and a first inner curved surface, said first outer curved surface being defined at least in part by a first outer projection at said one end of the first housing arm, and said first inner curved surface being defined at least in part by a first inner projection at said one end of the first housing arm,
   (b) a second housing arm having a second straight longitudinal guide groove and a second curved longitudinal guide groove which extends from one end of said second straight guide groove to a second opening at one end of said second housing arm, said second curved guide groove having a second outer curved surface and a second inner curved surface, said second outer curved surface being defined at least in part by a second outer projection at said one end of the second housing arm, and said second inner curved surface being defined at least in part by a second inner projection at said one end of the second housing arm, said first outer projection overlapping said second outer projection within the plane of said closure member and pivotally connected to said second outer projection for movement to a predetermined range of angular positions relative to said first housing arm with the plane of said closure member, said first and second outer projection at least partially overlapping within the plane of said closure member for said predetermined range of angular positions, said first and second openings being opposed within said plane,
   (c) a first straight elongated drive rod which is located within said first straight guide groove for longitudinal sliding movement within said first straight guide groove,
   (d) a second straight elongated drive rod which is located within said second straight guide groove for longitudinal sliding movement within said second straight guide groove, and
   (e) a flexible resilient connector which is connected to one end of the said first drive rod and to one end of said second drive rod so that said connector is located within said first and second curved longitudinal guide grooves for longitudinal sliding movement within said curved guide grooves.

2. Corner guide assembly as recited in claim 1, wherein said flexible connector comprises a plurality of spring-steel bands.

3. Corner guide assembly as recited in claim 1, wherein the inside to outside thickness of said curved guide grooves is substantially greater than the inside to outside thickness of said connector, said outer curved surfaces having a radius of curvature which corresponds to the largest bending radius of said connector when said housing arms are at their smallest relative angle within said predetermined range of angular positions, and said inner curved surfaces having a radius of curvature which corresponds to the smallest bending radius of said connector when said housing arms are at their largest relative angle within said predetermined range of angular positions.

4. Corner guide assembly as recited in claim 1, wherein said outer curved surfaces are opposed to said inner curved surfaces.

5. Corner guide assembly as recited in claim 1, wherein the inner and outer projections of each of said first and second housing arms have half the side to side thickness of the housing arm.

6. Corner guide assembly as recited in claim 5, wherein said first and second housing arms are identical and complementary with each other when said housing arms are positioned so that the outer projections of said first and second housings are on opposite sides of said closure member.

7. Corner guide assembly as recited in claim 1, wherein each of said housing arms is symmetrical on opposite sides of the central plane of said closure member along the straight guide groove, and wherein each of said housing arms is asymmetrical on opposite sides of said plane along the curved guide groove, the asymmetrical portions of said first housing arm being complementary with the asymmetrical portion of said second housing arm.

8. Corner guide assembly as recited in claim 1, wherein each of the adjoining sides of said closure member has a main groove along its outer side and a pair of opposite undercut grooves extending laterally from said main groove, and wherein each of said housing arms has an outer surface and, a pair of opposite side surfaces which are substantially normal to said outer surface and, said housing arm being substantially smaller in width between said side surfaces than said main groove, said corner guide assembly further comprising, a yoke for each of said housing arms which has a pair of elongated side walls which are connected by a U-shaped connecting portion, each of said walls having a laterally extending flange, said yoke being adapted to lie within the main groove and to straddle the housing arms so that the side walls of the yoke lie in the main groove between the side surfaces of the housing arm and the undercut grooves, said bridge portion is located outside of the outside surface of the housing arm and the flanges of the yoke extend into the undercut grooves.

* * * * *